C. E. WALLING.
VEHICLE WHEEL.
APPLICATION FILED MAR. 24, 1919.
1,338,471.
Patented Apr. 27, 1920.
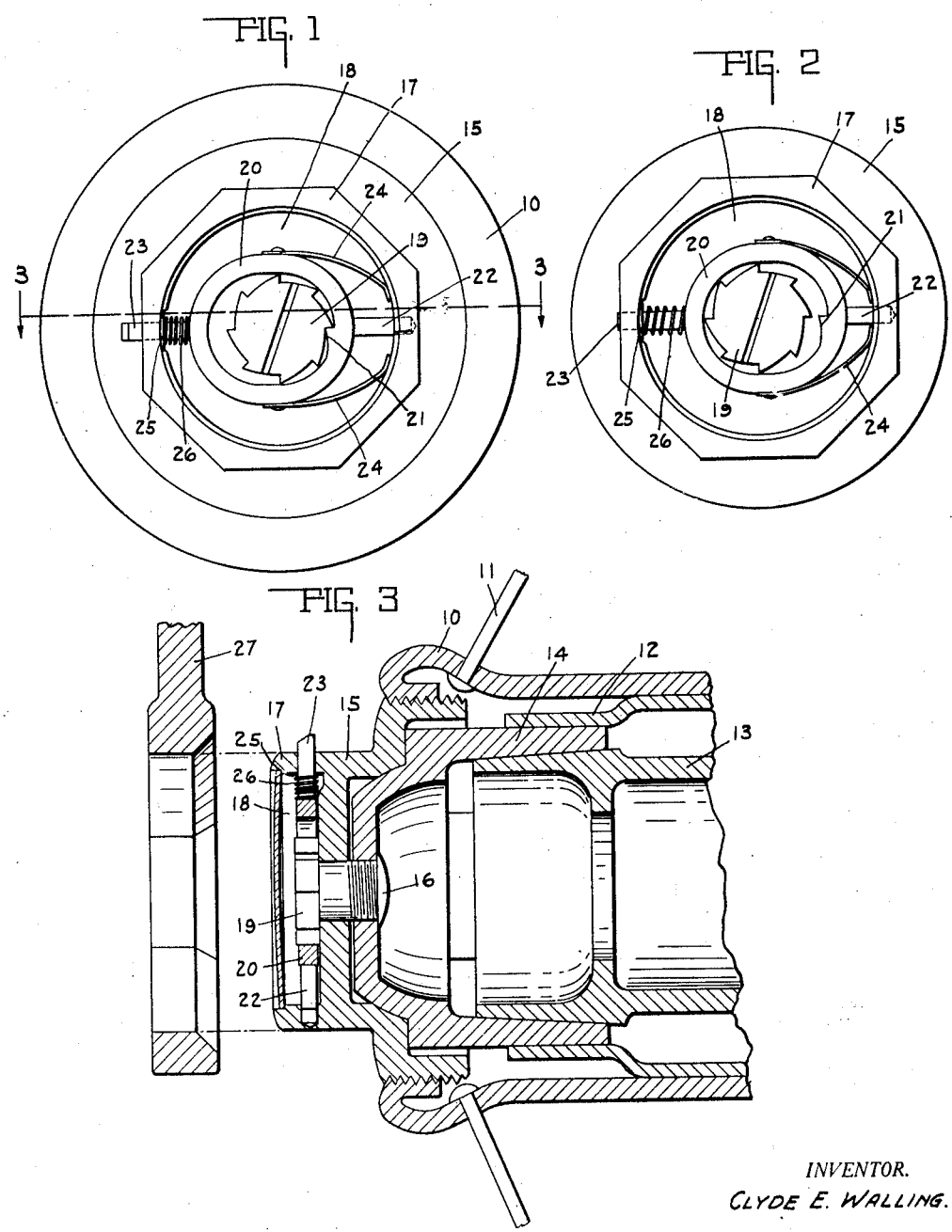
INVENTOR.
CLYDE E. WALLING.
BY
*Lockwood Lockwood*
ATTORNEYS

UNITED STATES PATENT OFFICE.

CLYDE E. WALLING, OF FRANKFORT, INDIANA.

VEHICLE-WHEEL.

1,338,471.     Specification of Letters Patent.     Patented Apr. 27, 1920.

Application filed March 24, 1919. Serial No. 284,589.

*To all whom it may concern:*

Be it known that I, CLYDE E. WALLING, a citizen of the United States, and a resident of Frankfort, county of Clinton, and State of Indiana, have invented a certain new and useful Vehicle-Wheel; and I do hereby declare that the following is a full, clear, and exact description thereof, reference being had to the accompanying drawings, in which like numerals refer to like parts.

This invention relates to the construction of demountable hubs especially adapted to be used with either metal or wooden wheels for automobiles and similar vehicles, and more particularly to means for positively locking the hub cap to prevent it from unscrewing from the hub.

The main feature of this invention consists of a locking device of a mechanically simple and efficient construction, adapted to be used on the hub cap of the demountable hub for preventing it from unscrewing therefrom when in operative position. Means is also provided for causing the locking device to be thrown into inoperative position whereby the hub cap may be readily unscrewed from the demountable hub, by simply placing the spanner over the cap nut in position ready for unscrewing.

By means of this construction the hub cap is positively locked to prevent its unscrewing from the demountable hub, except when a spanner is placed over the nut of the hub cap or a similar means is used for positively unlocking or throwing the device into inoperative position, at which time the hub cap may be readily unscrewed. When the hub cap is screwed into position and the spanner is removed the locking device automatically causes it to be locked, and therefore the device is made fool proof against careless operators.

In the accompanying drawings which are made a part of this application Figure 1 is a front elevation of a hub cap showing the locking device in operative position. Fig. 2 is the same as Fig. 1 showing the locking device in inoperative position. Fig. 3 is a cross section taken on a line 3—3 of Fig. 1.

There is shown herein a hub having an outer shell 10 with wire spokes 11 extending outwardly therefrom. The inner surface 12 of the shell 10 is so formed as to be engaged and locked with the inner hub or permanent hub member 13 by the keys 14 which are pivotally secured to the hub cap 15 by the bolt 16. The outer or demountable hub member, comprising the outer shell 10 and the inner surface 12, is rotatably locked to the inner or permanent hub member by the keys 14 which are secured to the hub cap 15, whereby the hub members are prevented from rotating relative to each other, which would permit them to come apart when the hub cap 15 is removed from the hub. For this reason it is found necessary to lock the hub cap on the hub to prevent its unscrewing therefrom and permit the separation of the hub member.

The nut portion 17 of the hub cap is provided with a recess or chamber 18. A ratchet or engaging member 19 is mounted in the recess 18 flat against the surface thereof and is rigidly secured to the bolt 16 which forms a part of the locking keys 14, and upon which the hub cap is rotatably mounted. A locking member 20 is slidably mounted in the recess 18 so as to surround the ratchet wheel 19 and is provided with a projection 21 adapted to engage the teeth of said ratchet wheel when the locking member 20 is in operative position as shown in Fig. 1. Extending from each side of said locking member there are pins 22 and 23. The pin 22 projects into a recess formed in the hub nut, and the pin 23 extends through a hole in the hub nut, whereby the locking member 20 is permitted to move back and forth in and out of locking position. On each side of the locking member there are springs 24 rigidly secured thereto and bearing against the inner surface of the recess 18 so as to force said locking member into locking position under tension as shown in Fig. 1 and permitting it to be forced into unlocking position as shown in Fig. 2 by forcing the pin 23 inwardly against the tension of the springs 24. Surrounding the pin 23 there is a washer 25 which is held against the inner surface of the recess 18 by a light coil spring 26 for preventing moisture and dust from entering said recess through the hole in the hub nut.

In mounting the hub cap on to the hub it is screwed into the outer shell 10, the locking keys 14 and the ratchet wheel 19 remaining rotatably fixed, and the projection 20 passing about the beveled side of the ratchet teeth. Therefore the hub cap can be readily screwed into position but will be locked by the projection engaging the ratchet teeth, from being screwed in the opposite direction. When it is desired to unscrew the hub cap the spanner 27 is mounted on the nut, the beveled edge thereof engaging the beveled edge of pin 23 and forcing it downward so as to cause the locking member 20 to be disengaged from the ratchet wheel 19, whereby the hub cap may be readily turned in the opposite direction for unscrewing it.

The invention claimed is:

1. The combination with an automobile hub having a locking key and a hub cap, of a locking means for preventing the hub cap from unscrewing from said hub, including an engaging member fixedly secured on said key, a locking member surrounding said engaging member and having a projection for engaging therewith, said locking member being slidably mounted on said hub cap, resilient means for normally holding said locking member in engagement with said engaging member, and means on said locking member in position to be engaged for forcing said members out of engagement against said yielding means for permitting the unscrewing of the cap from the hub.

2. The combination with an automobile hub having a locking key, and a hub cap having a recess therein of a locking means for preventing said hub cap from unscrewing from said hub, including an engaging member within said recess and fixedly secured to said key, a locking member slidably mounted in said recess in position to engage with said engaging member, a plurality of plate springs secured on each side of said locking member and yieldingly bearing against the inner periphery of said recess for normally retaining said locking member in engagement, and means on said locking member in position to be engaged for forcing said members out of engagement against said yielding means for permitting the unscrewing of the cap from the hub.

3. The combination with an automobile hub having a locking key, and a hub cap having a recess therein, of locking means for preventing said hub cap from unscrewing from said hub, including an engaging member mounted within said recess and fixedly secured on said key, a locking member slidably mounted within said recess and surrounding said engaging member in position to be engaged therewith, plate springs secured on each side of said locking member and bearing against the inner side of said recess for normally holding said members in engagement for preventing the unscrewing of said cap, and a pin on said locking member projecting from said recess in position to be engaged for forcing said members out of engagement against the spring tension of said plate springs for permitting the unscrewing of said cap from said hub.

In witness whereof I have hereunto affixed my signature.

CLYDE E. WALLING.